United States Patent
Liu et al.

(10) Patent No.: US 7,800,383 B2
(45) Date of Patent: Sep. 21, 2010

(54) APPARATUS AND METHOD FOR TESTING KEYBOARD OF MOBILE PHONE

(75) Inventors: Qing-Hua Liu, Shenzhen (CN); Chang-Liang Shao, Shenzhen (CN)

(73) Assignees: Hong-Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 127 days.

(21) Appl. No.: 12/237,611

(22) Filed: Sep. 25, 2008

(65) Prior Publication Data

US 2009/0289644 A1   Nov. 26, 2009

(30) Foreign Application Priority Data

May 23, 2008   (CN) .......................... 2008 1 0301743

(51) Int. Cl.
*G01R 31/02* (2006.01)

(52) U.S. Cl. ..................................... 324/754; 324/158.1
(58) Field of Classification Search .................. None
See application file for complete search history.

(56) References Cited

U.S. PATENT DOCUMENTS

| 5,501,518 | A  | * | 3/1996  | Woodward ................... 702/120 |
| 5,875,398 | A  | * | 2/1999  | Snapp ......................... 455/424 |
| 6,314,825 | B1 | * | 11/2001 | Fan ............................ 73/865.3 |
| 7,245,119 | B2 | * | 7/2007  | Ivannikov et al. ............ 455/425 |
| 2005/0256662 | A1 | * | 11/2005 | Alder ......................... 702/119 |
| 2007/0028148 | A1 | * | 2/2007  | Kulidjian et al. ............. 714/47 |
| 2009/0312009 | A1 | * | 12/2009 | Fishel ......................... 455/425 |

* cited by examiner

*Primary Examiner*—Vinh P Nguyen
(74) *Attorney, Agent, or Firm*—Clifford O. Chi

(57) ABSTRACT

An apparatus for testing a keyboard of a mobile phone, includes a testing controller, a key triggering device, an analog to digital (A/D) converter, and a switch assembly connected to the key triggering module. The switch assembly includes a plurality of switches. The key triggering device includes a key triggering module connected to the keyboard. The testing controller sends a controlling signal to trigger a key of the keyboard to turn on a switch corresponding to the key, triggering the key, and comparing activating information of the switch to the key value from the mobile phone to determine if the result is correct.

6 Claims, 2 Drawing Sheets

APPARATUS AND METHOD FOR TESTING KEYBOARD OF MOBILE PHONE

BACKGROUND

1. Technical Field

The present invention relates to an apparatus and a method for testing a keyboard of a mobile phone.

2. Description of the Related Art

Mobile phones are becoming increasingly popular, and phones with enhanced functionality are constantly in demand. To ensure that a mobile phone is functioning as expected, a series of tests are required. In a laboratory, a mobile phone is often subjected to functional tests for validating the performance. A functional test line of mobile phones has many workstations, and testing keyboards of the mobile phones is an important test. In a typical keyboard testing procedure for the mobile phones, triggering keys and judging the testing result are usually performed manually. However, the testing result may be wrong due to human error. Therefore, an apparatus and a method for testing a keyboard of a mobile phone is desired to overcome the above described deficiency.

DETAILED DESCRIPTION OF EMBODIMENTS

Figure 1:
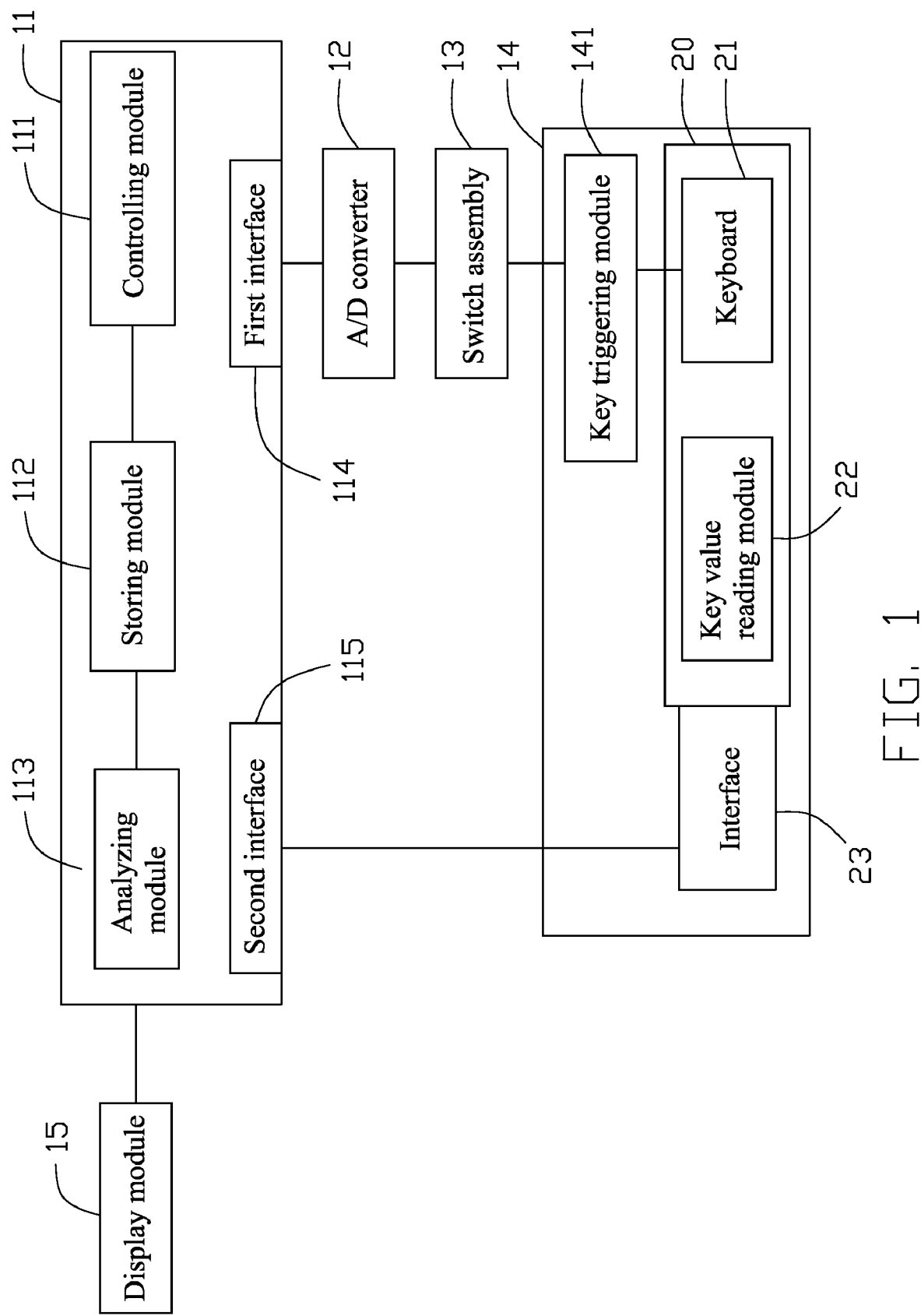
FIG. 1 is a schematic view of an embodiment of an apparatus for testing a keyboard of a mobile phone.

Referring to FIG. 1, an apparatus for testing a keyboard 21 of a mobile phone 20 includes a testing controller 11, an analog/digital (A/D) converter 12, a switch assembly 13, a key triggering device 14, and a display module 15.

The testing controller 11 includes a controlling module 111, a storing module 112, an analyzing module 113, a first interface 114, and a second interface 115. The controlling module 111 is used for sending a controlling signal to the switch assembly 13 for triggering keys. The storing module 112 is used for collecting and storing information from the switch assembly 13 when the controlling module 111 sends a key triggering signal of a corresponding key to the switch assembly 13. The switch assembly 13 includes a plurality of switches. The analyzing module 113 is used for comparing activating information of one of the switches with a key value from a mobile phone 20 when a key corresponding to the one of the switches is triggered.

One terminal of the A/D converter 12 is connected to the first interface 114. Another terminal of the A/D converter 12 is connected to one terminal of the switch assembly 13. Another terminal of the switch assembly 13 is connected to the key triggering device 14.

The mobile phone 20 is mounted on the key triggering device 14. The mobile phone 20 includes a keyboard 21, a key value reading module 22, and an interface 23 connected to the second interface 115. The key triggering device 14 includes a key triggering module 141. In the illustrated embodiment, the key triggering module 141 is a probe assembly. The probe assembly includes a plurality of probes. Each probe is electronically connected to a key of the keyboard 21.

The display module 15 is connected to the testing controller 11 and for displaying the testing result.

Figure 2:
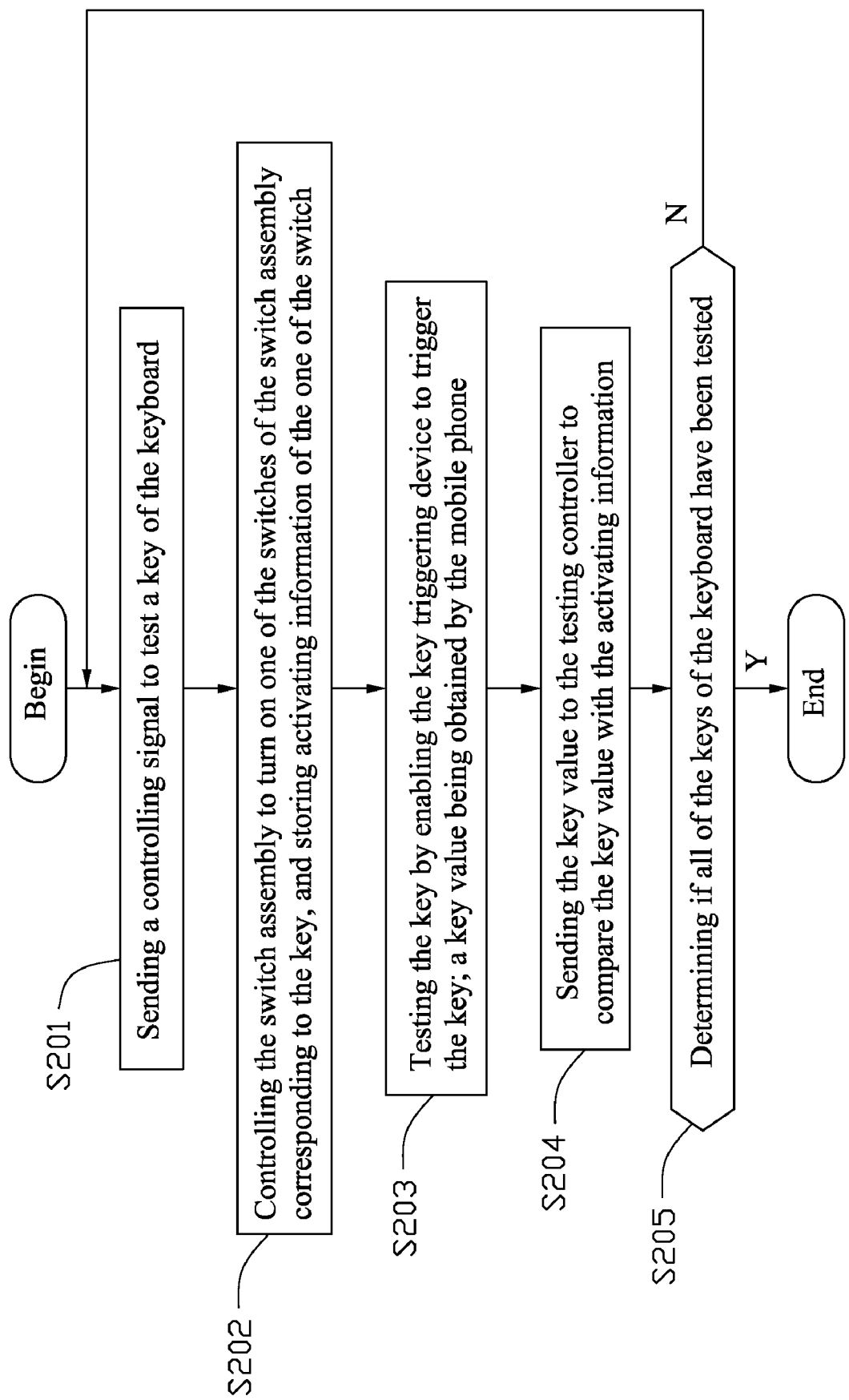
FIG. 2 is a flow chart of a method for testing the keyboard of the mobile by using the apparatus of FIG. 1.

FIG. 2 illustrates a method for testing the keyboard 21. Depending on the embodiment, certain of the steps described below may be removed, others may be added, and the sequence of steps may be altered.

In a step S201, the testing controller 11 sends a controlling signal for triggering a key of the keyboard 21;

Continuing to a step S202, the controlling signal is converted by the A/D converter 12, and sent to the switch assembly 13 to turn on one of the switches corresponding to the key, and the storing module 112 stores activating information of the one of the switches;

Continuing to a step S203, a corresponding probe of the triggering key module 141 delivers the controlling signal to the keyboard 21 to trigger the key in order to make a key value and sends the key value to the key value reading module 22, and the key value reading module 22 obtains the key value and stores it therein;

Continuing to a step S204, the key value reading module 22 delivers the key value to the testing controller 11 via the interface 23 and the second interface 115. The analyzing module 113 compares the activating information of the one of the switches stored in the storing module 112 with the key value, and determines if the testing result is correct and displays it on the display module 15.

Continuing to a step S205, the testing controller 11 determines if all of the keys of the keyboard 21 have been tested. If so, the test is over. If not, the method returns to S201 for another key until all of the keys of the keyboard 21 have been tested.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An apparatus for testing a keyboard of a mobile phone, comprising:
    a testing controller;
    a key triggering device comprising a key triggering module configured for connecting to the keyboard; and
    a switch assembly connected to the key triggering module, the switch assembly comprising a plurality of switches;
    wherein the testing controller sends a controlling signal to trigger a key of the keyboard to control the switch assembly to turn on one of the switches corresponding to the key, the key triggering module triggers the key, and the testing controller compares activating information from the one of the switches to a key value from the mobile phone.

2. The apparatus of claim 1, further comprising a display module connected to the testing controller for displaying the comparison of the activating information from one of the switches to a key value from the mobile phone.

3. The apparatus of claim 1, wherein the key triggering module is a probe assembly, the probe assembly having a plurality of probes, each probe is electrically connected to a corresponding key of the keyboard.

4. A method for testing a keyboard of a mobile phone, the method comprising:
    (a) providing an apparatus comprising:
        a testing controller;
        a key triggering device comprising a key triggering module configured for connecting to the keyboard; and a switch assembly connected to the key triggering module, the switch assembly comprising a plurality of switches;

(b) sending a controlling signal to test a key of the keyboard;

(c) controlling the switch assembly to turn on one of the switches of the switch assembly corresponding to the key and storing activating information of the one of the switches;

(d) testing the key by enabling the key triggering device to trigger the key; a key value is obtained by the mobile phone;

(e) sending the key value to the testing controller to compare the key value with the activating information;

(f) determining if all of the keys of the keyboard have been tested and returning to step (b) until all of the keys of the keyboard have been tested.

5. The method of claim 4, wherein the apparatus further comprises a display module connected to the testing controller; the method further comprising displaying the comparison of the key value with the activating information via the display module.

6. The apparatus of claim 4, wherein the key triggering module is a probe assembly, the probe assembly having a plurality of probes, each probe electrically connected to a corresponding key of the keyboard.

* * * * *